(12) United States Patent
Hayashi

(10) Patent No.: US 7,502,175 B2
(45) Date of Patent: Mar. 10, 2009

(54) ASPHERICAL LENS AND PROCESS FOR THE PRODUCTION THEREOF

(75) Inventor: Kazutaka Hayashi, Yokohama (JP)

(73) Assignee: Hoya Corporation, Tokyo (JP)

( * ) Notice: Subject to any disclaimer, the term of this patent is extended or adjusted under 35 U.S.C. 154(b) by 223 days.

(21) Appl. No.: 11/717,177

(22) Filed: Mar. 13, 2007

(65) Prior Publication Data

US 2007/0217031 A1 Sep. 20, 2007

(30) Foreign Application Priority Data

Mar. 20, 2006 (JP) .............................. 2006-076073

(51) Int. Cl.
  *G02B 3/02* (2006.01)
  *G02B 9/00* (2006.01)
(52) U.S. Cl. ........................ 359/718; 359/708; 359/719; 359/796; 359/900
(58) Field of Classification Search ................ 359/708, 359/718, 719, 642, 652, 691, 662, 900
See application file for complete search history.

(56) References Cited

U.S. PATENT DOCUMENTS

2005/0259334 A1 11/2005 Sekita

FOREIGN PATENT DOCUMENTS

JP 2005-331641 12/2005

*Primary Examiner*—William C Choi
*Assistant Examiner*—Jack Dinh
(74) *Attorney, Agent, or Firm*—Nixon & Vanderhye P.C.

(57) ABSTRACT

An aspherical lens formed of a high-refractivity low-dispersion glass, which is useful for constituting a compact and high-function image-sensing optical unit and which is formed by precision press-molding, the optical glass having a refractive index ($n_d$) of over 1.83 and an Abbe's number ($v_d$) of 40 or more and comprising, by mol %, 20 to 45% of $B_2O_3$, 5 to 24% of $La_2O_3$ and 22 to 42% of ZnO but containing no $Li_2O$, the aspherical lens having an optical thin film formed on a surface thereof.

9 Claims, 1 Drawing Sheet

ASPHERICAL LENS AND PROCESS FOR THE PRODUCTION THEREOF

FIELD OF THE INVENTION

The present invention relates to an aspherical lens formed of a precision-press-molded glass and a process for the production thereof.

TECHNICAL BACKGROUND

In recent years, there are growing demands for zoom lenses having large aperture ratios with tendencies toward the higher performance of digital cameras. The downsizing of an image-sensing optical system is accordingly required. As a zoom lens to fit with such a requirement, there is proposed an image-sensing optical system as described in JP-A-2005-331641.

The above image-sensing optical system has a first lens group with negative refractivity, a second lens group with positive refractivity and a third lens group with positive refractivity in the direction from an object side to an image side. The first lens group has a make-up of a lens with negative refractive power and a lens with positive refractive power, the second lens group has a make-up of a lens with positive refractive power and a lens with negative refractive power and the third lens group has a make-up of lenses with positive refractive power. The above image-sensing optical system has a member for determining a light reflux of an open F-number in a predetermined position.

When attention is focused on the above first lens group, the lens with negative refractivity (to be referred to as "lens G11" hereinafter) is formed of a glass having high refractivity represented by a refractive index ($n_d$) of over 1.83 and a low dispersion property represented by an Abbe's number ($v_d$) of 40 or more, and it is a concave meniscus lens both surfaces of which have aspherical forms. On the other hand, the lens with positive refractivity (to be referred to as "lens G12" hereinafter) is a spherical convex meniscus lens formed of a glass having high refractivity represented by a refractive index ($n_d$) of 1.82 or more and a high dispersion property represented by an Abbe's number ($v_d$) of 25 or less.

DISCLOSURE OF THE INVENTION

Problems to be Solved by the Invention

The above lens G12 is a spherical lens and can be produced by grinding and polishing. On the other hand, the lens G11 is an aspherical lens, so that it is desirable to produce it by a precision press molding method that is also called an optics molding method. The glass for constituting the lens G11 is required to have a low-temperature-softening property suitable for precision press-molding.

From the viewpoint of optical properties, both the lenses G11 and G12 are desirably formed of high-refractivity glasses for downsizing. In a zoom lens, further, it is desired to correct the chromatic aberration of each of the lens groups. And, when a difference in Abbe's number between the glass constituting the lens G11 and the glass constituting the lens G12 is increased, both the well correction of the chromatic aberration and the downsizing can be satisfied.

For complying with the above requirement, it is at least required to produce the lens G11 from a glass having an Abbe's number ($v_d$) of 40 or more. The lens G12 is formed of a high-refractivity high-dispersion glass having a refractive index ($n_d$) of 1.82 or more and an Abbe's number ($v_d$) of 25 or less as described above. For further increasing the refractive index ($n_d$) and further decreasing the Abbe's number ($v_d$), it would be necessary to increase the amount of components that impart the glass with high-refractivity and high-dispersion properties, such as $Nb_2O_5$, $TiO_2$ and the like. However, these are components which may increase the coloring of the glass to decrease the transmittance on the short wavelength side of the visible light region. In an image-sensing optical system composed of a number of lenses, such as a zoom lens, it is demanded to increase the transmittance of each lens, so that it is desirable to increase the Abbe's number difference between the lens G12 and the lens G11 in a manner that the Abbe's number ($v_d$) of the glass constituting the lens G12 is not decreased to excess but that the Abbe's number ($v_d$) of the glass constituting the less G11 is increased to 40 or more.

When the color correction is performed by processing an image data taken by an image-sensing optical system that is not so severely demanded with regard to the coloring of the lens G12, such as an image-sensing device of CCD or CMOS (e.g., a digital camera or a digital video camera), the lens G12 may be formed of a glass having a higher refractivity and lower dispersion. Even in such a case, however, the glass constituting the lens G11 desirably has properties represented by a refractive index ($n_d$) of over 1.83 and an Abbe's number ($v_d$) of 40 or more.

Meanwhile, in a zoom lens, the number of lenses constituting the same is large as compared with an image-sensing optical system of which the focal length is fixed. It is therefore required to take it into account that the surface reflection of each lens is suppressed to a low level by forming anti-reflection films. However, when the lens G11 is coated with an anti-reflection film, there is sometimes caused a problem regarding its adhesion to the glass surface produced by precision press-molding, i.e., the aspherical optical-function surface and a problem regarding its durability.

The present invention has been made for overcoming the above problems and seeks to provide an aspherical lens that is formed of a high-refractivity low-dispersion glass and that is useful for constituting a compact and high-performance image-sensing optical system, and a process for the production thereof.

Means to Solve the Problems

As means for overcoming the above problems, the present invention provides:

(1) an aspherical lens formed by precision press-molding an optical glass, the aspherical lens being formed of an optical glass having a refractive index ($n_d$) of over 1.83 and an Abbe's number ($v_d$) of 40 or more and comprising, by mol %, 20 to 45% of $B_2O_3$, 5 to 24% of $La_2O_3$ and 22 to 42% of ZnO but containing no $Li_2O$, the aspherical lens having an optical thin film formed on a surface thereof, (2) an aspherical lens as recited in the above (1), wherein said optical glass contains, as optional components, 0 to 20% of $Gd_2O_3$, 0 to 20% of $SiO_2$, 0 to 10% of $ZrO_2$, 0 to 10% of $Ta_2O_5$, 0 to 10% of $WO_3$, 0 to 10% of $Nb_2O_5$, 0 to 10% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$, (3) an aspherical lens as recited in the above (1) or (2), wherein said optical glass has a glass transition temperature of less than 640° C., (4) an aspherical lens as recited in any one of the above (1) to (3), which is a lens to be positioned closest to an object in an image-sensing optical system having a plurality of lenses that are arranged from an object side to an image side, (5) A process for the production of an aspherical lens through the steps of heating a glass material formed of an optical glass and precision press-molding the glass material, the process comprising heating a glass material formed of an optical glass that has a refractive index ($n_d$) of over 1.83 and an Abbe's number ($v_d$) of 40 or more, that comprises, by mol %, 20 to 45% of $B_2O_3$, 5 to 24% of $La_2O_3$ and 22 to 42% of ZnO but that contains no $Li_2O$, precision press-molding the glass material and forming an optical thin film on a surface thereof, (6) a process for the production of an aspherical lens as recited in the above (5), wherein an aspherical lens obtained by the precision press-molding is annealed and then ground or polished to form a non-optical function surface, the aspherical lens is washed and then the optical thin film is formed on the optical function surface, (7) a lens unit having either the aspherical lens recited in any one of the above (1) to (4) or an aspherical lens produced by the process recited in the above (5) or (6) and a lens with positive refractive power which is formed of an optical glass having a refractive index ($n_d$) of 1.82 or more and an Abbe's number ($v_d$) of 25 or less and which has an anti-reflection film, said aspherical lens having negative refractive power and having an anti-reflection film, said aspherical lens and said lens with positive refractive power being combined to correct chromatic aberration, and (8) an image-sensing optical unit comprising the lens unit recited in the above (7).

EFFECT OF THE INVENTION

Figure 1:
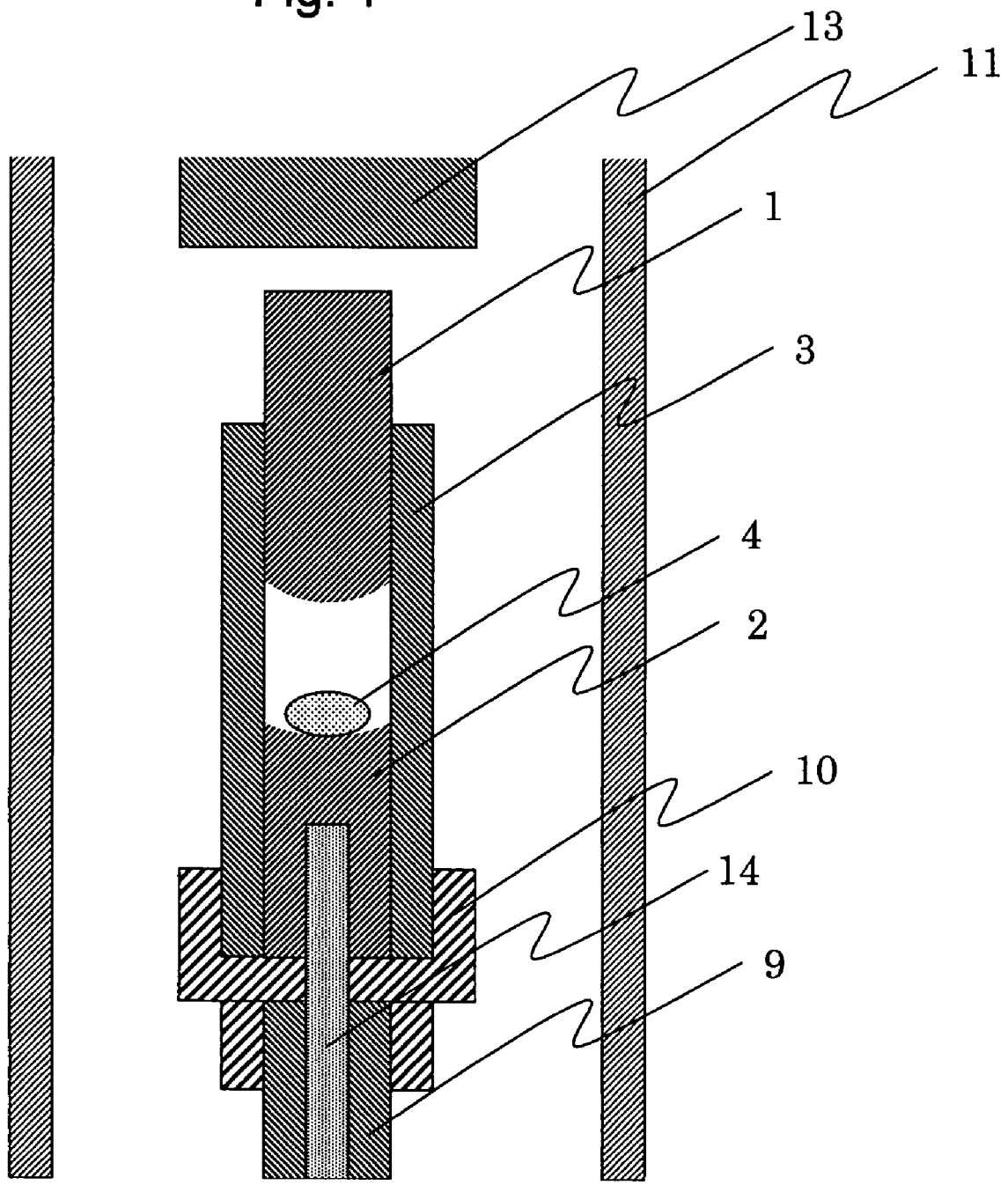
FIG. 1 shows a schematic cross-sectional view of one example of the precision press-molding apparatus used in Example 1.

According to the present invention, there can be provided an aspherical lens that is formed of a high-refractivity low-dispersion glass and that is useful for constituting a compact and high-performance image-sensing optical system and a process for the production thereof.

Further, there can be also provided a compact and high-performance lens unit comprising the above aspherical lens and an image-sensing optical unit comprising the above lens unit.

PREFERRED EMBODIMENTS OF THE INVENTION

In an aspherical lens produced by precision press-molding a glass material formed of an optical glass, there is sometimes caused a problem on the adhesion of an optical thin film such as an anti-reflection film coated on the surface of the aspherical lens. This problem takes place in a lens produced by precision press-molding a specific glass.

The present inventor has made studied the above problem to obtain the following finding.

It is considered that the above problem is caused by the physical property of a lens surface formed by precision press-molding. Fogging or yellowing is sometimes found on the lens surface before it is coated with an anti-reflection film. Surface alteration that is hardly recognizable as fogging or yellowing is considered to cause the degradation of the adhesion of an optical thin film to the lens surface. That is, it is considered that even a lens that does not appear to have fogging or yellowing highly possibly causes the degradation of the adhesion.

A lens that is easily fogged or yellowed has a high refractive index and has a glass transition temperature in a temperature range that allows precision press-molding, while the lens is formed of a glass having a relatively high glass transition temperature. Such a glass contains $Li_2O$ for increasing its refractive index and decreasing its glass transition temperature and contains a large amount of $B_2O_3$ as a component for forming a glass network.

$Li_2O$ and $B_2O_3$ contained in the above glass are both highly volatile components and volatilize from the glass surface at a high temperature. When the heating temperature is high during precision press-molding, the volatilization takes place to a greater degree and components that have volatilized adhere to the lens surface or a press mold. When the press mold is repeatedly used, components that have volatilized and adhered to the mold then adhere to a lens being molded.

Further, in a precision press-molding method in which a carbon film for ensuring the easier spreading of a glass inside a press mold is coated on the glass material surface, a component that has volatilized and carbon in the coating react to cause the fogging of the lens surface.

For overcoming the above problem, therefore, it is effective to exclude $Li_2O$ from the glass. Since, however, $Li_2O$ is a component having the effect of maintaining a high refractive index and at the same time greatly decreasing the glass transition temperature, it is required to introduce or add to ZnO that works in place of $Li_2O$ to maintain a high refractive index and at the same time decrease the glass transition temperature. In particular when the glass transition temperature is 640° C. or higher, even a glass from which $Li_2O$ is excluded comes to undergo great volatilization during precision press-molding, and further, the deterioration of the press mold is increased, so that it is desirable to ensure that the glass transition temperature ($T_g$) is less than 640° C. For this purpose, at least 22mol % of ZnO is introduced to prevent an increase in the glass transition temperature. However, when ZnO is introduced to excess, the requirement of an Abbe's number ($v_d$) of 40 or more for a lens intended for use in a compact and high-performance image-sensing optical system can be no longer satisfied, the chemical durability of the glass is degraded to impair the properties of the lens surface, and the adhesion of an optical thin film is decreased. Further, the devitrification resistance is also decreased, and the glass is liable to devitrify during the shaping of a glass material or during precision press-molding. It is therefore required to limit the content of ZnO to 42 mol % or less.

Differing from $Li_2O$, $B_2O_3$ is a component for forming a glass network and cannot be excluded from components of the glass, and it is required to introduce at least 20 mol % of $B_2O_3$. However, it is required to limit the content thereof to 45 mol % or less for decreasing the volatility.

$La_2O_3$ is an essential component for maintaining the stability against devitrification and the low-dispersion property of the glass and at the same time increasing the refractive index and chemical durability. At least 5 mol % of $La_2O_3$ is introduced. When it is introduced to excess, the stability of the glass against devitrification is degraded, so that the upper limit of the content of $La_2O_3$ is limited to 24 mol % or less.

The present invention has been accordingly completed. That is, the aspherical lens of the present invention is an aspherical lens formed by precision press-molding an optical glass, the aspherical lens being formed of an optical glass having a refractive index ($n_d$) of over 1.83 and an Abbe's number ($v_d$)

of 40 or more and comprising, by mol %, 20 to 45% of $B_2O_3$, 5 to 24% of $La_2O_3$ and 22 to 42% of ZnO but containing no $Li_2O$, the aspherical lens having an optical thin film formed on a surface thereof.

That is, the aspherical lens of the present invention is a lens that is produced in the form of an aspherical lens by precision press-molding for optimizing it for use in a compact and high-performance image-sensing system having a zoom function, and the lens is formed by molding an optical glass having optical properties represented by a refractive index ($n_d$) of over 1.83 and an Abbe's number ($v_d$) of 40 or more for imparting the lens with performances suitable as a lens with negative refractive power to be positioned at the fore-end of the above optical system (closest to an object when lenses are counted). And, the surface thereof is provided with an optical thin film such as an anti-reflection film for decreasing surface reflection and preventing a ghost and a flare. Since the aspherical lens is molded from a glass having the above composition as described above, the optical thin film is improved in adhesion and a highly reliable lens can be provided.

Desirably, the above glass contains neither $Li_2O$ nor any other alkali metal component.

When the above lens is used as a lens positioned closest to an object in an image-sensing optical system having a constitution of a plurality of lenses arranged from an object side to an image side, the lens is used in a state where the lens is constantly exposed to the outside air or is splashed with water drops, and it is thus used under hard conditions as compared with the other lenses that are not exposed. In the foremost lens, therefore, it is technically important to maintain the durability of the optical thin film provided on the lens surface.

The aspherical lens of the present invention is preferably formed of an optical glass having a glass transition temperature of less than 640° C. The reason therefore is as described above. That is, an excess increase in the temperature required for heating a glass material and a press mold during precision press-molding can be suppressed so that the amount of volatilized components from a glass may not be increased and that the deterioration of a press mold may not be promoted. The above glass transition temperature is preferably 630° C. or lower, more preferably 620° C. or lower, still more preferably 615° C. or lower.

The aspherical lens of the present invention is particularly suitable as a lens with negative refractive power (e.g., a concave meniscus lens, a double-concave lens or a plano-concave lens). When a lens having the above form is produced by precision press-molding, a glass material is placed in the center portion of a press mold and pressed. And, the glass material is spread under pressure into a space (cavity) surrounded by a press mold, and the glass distributed in the center portion comes to have a large volume distribution in the circumferential portion of the cavity due to the pressing. That is, with regard to a lens with negative refractive power, there is a large difference between the glass volume distribution that the glass has before precision press-molding and the glass volume distribution that the glass has after the precision press-molding as compared with a lens with positive refractive power (e.g., a convex meniscus lens, a double-convex lens or a plano-convex lens). In the above molding, the extension failure of the glass is liable to take place, so that the heating temperature during the precision press-molding is sometimes set at a higher level. In this case, when the glass transition temperature is very close to the upper limit of the temperature range in which the precision press-molding is permitted, the heating temperature sometimes exceeds the proper temperature range in the production of a lens with negative refractive power by molding. However, when the glass transition temperature of a glass material is limited to the above range, an excellent lens can be provided with any problem even if it is a lens with negative refractive power.

On the other hand, when the glass transition temperature of an $Li_2O$-free glass is decreased to excess, it is sometimes difficult to obtain desired optical properties or the glass is sometimes degraded in stability against devitrification. The lower limit of the glass transition temperature is therefore preferably 590° C. or higher, more preferably 595° C. or higher, still more preferably 600° C. or higher.

The glass for use in the present invention will be described in detail below. Contents or total contents of glass components and contents of additives shown by % below stand for contents or total contents by mol %, and content ratios below mean molar ratios.

$B_2O_3$ has been already explained. The content thereof is 20 to 45%, preferably 20 to 43%, more preferably 20 to 40%, still more preferably 22 to 38%, yet more preferably 24 to 38%.

$La_2O_3$ has been already explained. The content thereof is 5 to 24%, preferably 6 to 23%, more preferably 7 to 22%.

ZnO has been already explained. The content thereof is 22 to 42%, preferably 23 to 41%.

$Li_2O$ is not introduced as a glass component for the already explained reason, while it is not required to completely exclude the same at an impurity level.

Further, it is preferred not to introduce $Na_2O$, $K_2O$ and $Cs_2O$ for the already described reason. In a method in which a glass material for use in the production of an aspherical lens by precision press-molding is shaped directly from a molten glass gob, alkali metal components in the glass volatilize to cause striae and the optical homogeneity is sometimes degraded. In contrast, when a glass containing none of $Li_2O$, $Na_2O$, $K_2O$ and $Cs_2O$ is used, there can be produced a glass material free of devitrification and striae, and a high-quality aspherical lens can be provided.

The above optical glass may contain the following components as optional components.

Like $La_2O_3$, $Gd_2O_3$ is a component that improves the glass in refractivity and chemical durability without degrading the stability against devitrification and the low-dispersion property. When $Gd_2O_3$ is introduced in an amount of over 20%, the stability against devitrification is degraded, the glass transition temperature is increased and the precision press-moldability tends to be degraded, so that it is preferred to introduce 0 to 20% of $Gd_2O_3$. For imparting high refractivity and at the same time improving the chemical durability, it is preferred to introduce 1 to 19% of $Gd_2O_3$. The content of $Gd_2O_3$ is more preferably in the range of 2 to 18%. For improving the glass stability, a composition having a co-presence of $La_2O_3$ and $Gd_2O_3$ as glass components is preferred. When it is intended to use the glass in particular in the production of a precision press-molding glass material from a molten glass by shaping the glass during its cooling process, it is important to further improve the glass stability as described above for preventing the devitrification of the glass in its shaping process.

For maintaining an Abbe's number ($v_d$) of 40 or more and at the same obtaining a high-refractivity glass, the total content of $La_2O_3$ and $Gd_2O_3$ is preferably adjusted to 10 to 24%, more preferably to 12 to 23%.

With regard to a glass having large contents of $La_2O_3$ and $Gd_2O_3$, $SiO_2$ decreases the liquidus temperature of the glass, improves the glass in high-temperature viscosity and greatly improves the glass in stability. However, $SiO_2$ is introduced to excess, the refractive index of the glass is decreased and moreover the glass transition temperature is increased, so that the precision press-molding thereof is difficult. The content of $SiO_2$ is therefore preferably 0 to 20%, more preferably 0 to 18%.

$ZrO_2$ is an optional component that is used as a component for high refractivity and low dispersion. When introduced, $ZrO_2$ produces the effect of improving the glass in high-temperature viscosity and stability against devitrification without decreasing the refractive index of the glass. However, when over 10% of $ZrO_2$ is introduced, the liquidus temperature is sharply increased and the stability against devitrification is degraded. The content of $ZrO_2$ is therefore preferably 0 to 10%, more preferably 0 to 8%.

$Ta_2O_5$ is an optional component that is used as a component for high refractivity and low dispersion. When introduced in a small amount, $Ta_2O_5$ produces the effect of improving the high-temperature viscosity and the stability against devitrification without decreasing the refractive index of the glass. When over 10% of $Ta_2O_5$ is introduced, the liquidus temperature is sharply increased and the dispersion is increased. The content thereof is therefore preferably 0 to 10%, more preferably 0 to 8%.

$WO_3$ is a component that is introduced as required for improving the glass in stability and meltability and increasing the refractive index. When the content of $WO_3$ exceeds 10%, the dispersion is increased and the low-dispersion property required can be no longer obtained. The content thereof is therefore preferably 0 to 10%, more preferably 0 to 8%.

$Nb_2O_5$ is an optional component for maintaining the glass stability and at the same increasing the refractive index. When it is introduced to excess, the dispersion is increased. The content thereof is therefore preferably 0 to 10%, more preferably 0 to 8%.

$TiO_2$ is an optional component that can be introduced for adjusting the optical constants. When it is introduced to excess, however, the dispersion is increased and the intended optical constants can be no longer obtained. The content of $TiO_2$ is therefore limited to 0 to 10%, more preferably to 0 to 8%. It is still more preferred to introduce no $TiO_2$.

$Bi_2O_3$ works to increase the refractive index and improve the glass stability. When it is introduced to excess, the glass stability is degraded and the liquidus temperature is increased. The content thereof is therefore preferably 0 to 10%, more preferably 0 to 6%.

$GeO_2$ is an optional component that works to increase the refractive index and improve the glass stability. The content thereof is preferably 0 to 10%, more preferably 0 to 8%. Since, however, $GeO_2$ is incommensurably expensive as compared with other components, it is much more preferred to introduce no $GeO_2$.

$Ga_2O_3$ is also a component that works to increase the refractive index and improve the glass stability, and the content thereof is preferably 0 to 10%, more preferably 0 to 8%. Since, however, $Ga_2O_3$ is incommensurably expensive as compared with other components, it is much more preferred to introduce no $Ga_2O_3$.

$Al_2O_3$ works to improve the glass in high-temperature viscosity, decrease the liquidus temperature and improve the glass in moldability, and it also works to improve the chemical durability. When it is introduced to excess, the refractive index is decreased and the stability against devitrification is also decreased. The content thereof is therefore preferably 0 to 10%, more preferably 0 to 8%.

BaO is an optional component that is used as a component for high refractivity and low dispersion. When introduced in a small amount, BaO improves the glass in stability and chemical durability. When more than 10% of BaO is introduced, the stability of the glass against devitrification is greatly impaired and the transition temperature and sag temperature of the glass are increased. The content thereof is preferably 0 to 10%, more preferably 0 to 8%.

$Y_2O_3$ and $Yb_2O_3$ are optional components that are used as components for high refractivity and low dispersion. When introduced in a small amount, they improve the glass in stability and chemical durability. When they are introduced to excess, the stability of the glass against devitrification is greatly impaired and the glass transition temperature and sag temperature are increased. Therefore, the content of $Y_2O_3$ is preferably 0 to 10%, more preferably 0 to 8% and the content of $Yb_2O_3$ is preferably 0 to 10%, more preferably 0 to 8%.

The total content of $La_2O_3$, $Gd_2O_3$, $Y_2O_3$ and $Yb_2O_3$ is preferably adjusted to 10 to 24%.

In addition, $Sb_2O_3$ is added as required as a defoaming or refining agent. When the amount of $Sb_2O_3$ based on the total content of all of the glass components exceeds 1% by weight, the molding surface of a press mold may be damaged during precision press-molding. The content of $Sb_2O_3$ based on the total content of all of the glass components is preferably 0 to 1% by weight, more preferably 0 to 0.5% by weight.

PbO is among those of which the introduction as glass components is not preferred. PbO is harmful, and moreover when a glass material formed of a glass containing PbO is precision press-molded in a non-oxidizing atmosphere, lead is deposited on the surface of a molded product to cause the problems that the transparency of a lens is impaired and that the deposited metal lead adheres to a press mold.

$Lu_2O_3$ is less frequently used as general optical glass component than other components, and it has a high rarity value and is expensive as a raw material for an optical glass, so that it is preferred to introduce no $Lu_2O_3$. An optical glass having the above composition can realize a glass material suitable for precision press-molding without introducing $Lu_2O_3$.

The optical glass desirably contains none of elements that would possibly create environmental problems such as cadmium, tellurium, etc., radioactive elements such as thorium, etc., and toxic elements such as arsenic, etc. Further, it desirably does not contain fluorine in view of problems such as volatilization during melting of the glass.

The optical properties of the above glass will be explained below. First, the Abbe's number ($v_d$) of the glass is 40 or more as described above and the upper limit thereof is preferably limited to 50 for imparting the glass with stability suitable for molding the glass as a material. The above glass has a refractive index ($n_d$) of over 1.83, more preferably a high refractive index ($n_d$) of 1.84 or more, still more preferably a high refractive index ($n_d$) of 1.85 or more.

The upper limit of the refractive index ($n_d$) is not specially limited, while the refractive index ($n_d$) is yet more preferably adjusted to 1.90 or less for maintaining the glass stability.

The above optical glass can be obtained by weighing and formulating oxides, carbonates, sulfates, nitrates, hydroxides, etc., as raw materials so as to obtain an intended glass composition, fully mixing them to prepare a mixture batch, carrying out heating, melting, defoaming and stirring of the batch in a melting vessel to prepare a homogeneous and bubble-free molten glass and shaping it into a glass material. Specifically, the above optical glass can be produced by a known melting method.

The glass material for use in the production of the aspherical lens of the present invention is also called a preform, and it is a preliminary glass shaped material that is to be heated and precision press-molded.

The precision press-molding is also called "optics molding" as is well known, and it is a method in which the optical-function surface of an optical element is formed by transfer of the form of molding surface of a press mold. The optical-function surface means a surface that refracts, reflects, diffracts or passes light as an object to be controlled and, for example, the lens surface of a lens corresponds to the optical-function surface.

The surface of the glass material is preferably coated with a carbon-containing film so that the glass fully spreads in a mold during the precision press-molding. Desirably, the carbon-containing film is composed of carbon as a main component (a film containing carbon whose content is larger than the content of any other element when the contents of elements in the film are represented by atomic%). Specific examples thereof include a carbon film and a hydrocarbon film. When the glass material surface is coated with a carbon-containing film, the fusion of the glass and the mold surface can be prevented during the precision press-molding. For example, a graphite-like carbon film can be preferably employed as a carbon-containing film. As a method for forming the carbon-containing film, there can be employed a known method using a carbon material, such as a vacuum vapor deposition method, a sputtering method, an ion plating method or the like, or a known method such as thermal decomposition using a gas such as hydrocarbon.

The carbon-containing film exhibits excellent functions during the precision press-molding as described above. However, when a glass containing $Li_2O$ is precision press-molded, it is one of causes of fogging or yellowing on a lens surface. It is considered that the fogging or yellowing is caused since Li ion in the glass and carbon in the film react in a high-temperature state to generate a carbonate on the glass surface. The lens of the present invention is formed of the $Li_2O$-free glass, preferably a glass free of alkali metals, so that the occurrence of fogging and yellowing on a molded article surface can be prevented even if the precision press-molding is carried out in a state where the carbon-containing film is formed on the glass surface.

The carbonate on the lens surface is generated not only by a reaction between carbon existing in the film on the glass surface and Li ion in the glass but also by bringing a glass material or lens formed of a glass containing Li ion into a high-temperature state in a carbon-containing atmosphere. For example, the carbonate can be generated by heating a preform in a carbon-containing atmosphere when a carbon-containing film is formed on the glass material (preform), or it can be also generated when a lens is annealed in a carbon-containing atmosphere, e.g., in the atmosphere. Since, however, the present invention uses the $Li_2O$-free glass, the occurrence of the fogging and yellowing on the glass surface can be prevented even if the above treatment is carried out, and the adhesion of the optical thin film to the lens surface can be improved.

In a lens obtained by the precision press-molding, a lens circumferential portion surrounding the optical-function surface is ground or polished in some cases like a centering and edging process. Before the above step of polishing the non-optical-function surface, desirably, the lens is annealed to decrease a strain so that the breaking of the lens may be prevented during the grinding or polishing. In a lens formed of a glass containing $Li_2O$, Li salt may adhere to its optical-function surface under heat during the annealing, to decrease the adhesion of an optical thin film. The present invention is hence more effective for a lens whose non-optical-function surface (surface other than the optical-function surface) is formed by grinding and/or polishing and whose optical-function surface is formed by the precision press-molding and provided with the optical thin film.

The optical thin film includes an anti-reflection film and a film that reflects light having a predetermined wavelength. Concerning a film structure, it may be a single-layer film or may be a multi-layer film.

As an anti-reflection film, materials such as magnesium fluoride, silicon oxide, aluminum oxide, zirconium oxide, titanium oxide, tantalum oxide, etc., are used, a film thickness and a film constitution are designed according to a known method, and a method such as a vapor deposition method or the like is employed to form a predetermined film on the lens surface. In addition, since the lens is used in an image-sensing optical system, a multi-layer structure is preferably employed as a film structure so that the anti-reflection effect can be obtained in the entire visible light region.

The process for the production of an aspherical lens, provided by the present invention, will be explained below. The process of the present invention is a process for the production of an aspherical lens through the steps of heating a glass material formed of an optical glass and precision press-molding the glass material, the process comprising heating a glass material formed of an optical glass that has a refractive index ($n_d$) of over 1.83 and an Abbe's number ($v_d$) of 40 or more, that comprises, by mol %, 20 to 45% of $B_2O_3$, 5 to 24% of $La_2O_3$ and 22 to 42% of ZnO but that contains no $Li_2O$, precision press-molding the glass material and forming an optical thin film on a surface thereof.

The function of the lens, the function of the glass, the glass material, preferred compositions and properties, precision press-molding and improvements of adhesion of the optical thin film in the present invention are as described already.

The press mold and molding conditions for the precision press-molding can be selected from those that are known. Since, however, the glass material formed of the $Li_2O$-free glass (preferably, the glass free of alkali metal components) is precision press-molded, the press-molding temperature tends to increase as compared with the press-molding temperature for a glass having a large content of $Li_2O$. Under the circumstances, it is preferred to use a press mold made of SiC having remarkably high heat resistance. It is preferred to form a carbon-containing film, preferably a carbon film, on the molding surface of the mold made of SiC. The carbon film can be formed by a vapor deposition or CVD method or some other method. When this mold is used, it is preferred to use a glass material that is surface-coated with the above-explained carbon-containing film for carrying out excellent precision press-molding.

Even when the above precision press-molding is carried out, the adhesion of the optical thin film can be maintained in an excellent state owing to the use of the glass material formed of the above optical glass.

In the precision press-molding using at least one of a press mold made of SiC, a press mold whose molding surface is provided with a carbon-containing film and a glass material that is surface-coated with a carbon-containing film, it is preferred to carry out the precision press-molding in an atmosphere of a non-oxidizing gas such as a nitrogen gas or a mixture of a nitrogen gas with a hydrogen gas for preventing the oxidation of the molding surface of a press mold or a release film formed on the above molding surface and the oxidation of a coating on the glass material surface. In the non-oxidizing atmosphere, the carbon-containing film coating the glass material surface is not oxidized, and this film remains on the surface of a molded product obtained by the precision press-molding. The above film is to be finally removed. For relatively easily and completely removing the carbon-containing film, a lens can be heated in an oxidizing atmosphere, e.g., in the atmosphere. Since the glass constituting the lens is free of $Li_2O$, preferably free of alkali components, there is no case where carbon in the carbon-containing film or carbon dioxide in the atmosphere reacts with Li ion in the glass to form a carbonate on the glass surface, so that the carbon-containing film can be removed while preventing fogging and yellowing.

In addition, it is required to carry out the oxidation and removal of the carbon-containing film at a temperature at which the lens would not be deformed by heating or lower. Specifically, it is preferred to carry out the oxidation and removal in a temperature range below the glass transition temperature.

In the precision press-molding, a glass material that is pre-heated to a temperature equivalent to a glass viscosity of $10^4$ to $10^8$ Pa·s is supplied between a pair of opposed upper and lower mold members whose molding surfaces are precisely worked in form and the glass material is press-molded, whereby the form(s) of the molding surface(s) of the mold can be transferred to the glass material. The pressure and the time period for the pressing can be determined as required by taking account of the viscosity of the optical glass, etc., and for example, the pressing pressure can be set at approximately 5 to 15 MPa and the pressing time period can be set for 10 to 300 seconds. Pressing conditions such as a pressing time period, a pressing pressure, etc., can be set in known ranges as required depending upon the form and dimensions of a molded product.

Then, the mold and the glass molded product are cooled and preferably at a temperature of a strain point or less, the mold is opened and the glass molded product is taken out. For precisely adjusting the optical properties to desired values, conditions for annealing the glass molded product during its cooling such as an annealing rate, etc., may be adjusted as required.

The above precision press-molding method is a method in which the glass material is introduced into a press mold and both the glass material and the press mold are heated to carry out the precision press-molding, while there may be employed a constitution in which the glass material is heated and introduced to the press mold that is pre-heated to carry out the precision press-molding. In the latter method, the temperature for pre-heating the press mold can be set at a temperature lower than the temperature for heating the glass material and hence the temperature to which the press mold is exposed can be decreased, so that a load on the mold can be decreased. Even when the press-molding temperature is increased due to the employment of a glass free of $Li_2O$, the above method can reduce the load on the mold.

The present invention is suitable for a case where an aspherical lens obtained by the precision press-molding is annealed, then a non-optical-function surface is formed by grinding or polishing, the aspherical lens is washed and an optical thin film is formed on an optical-function surface. The formation of a non-optical-function surface by grinding or polishing includes, for example, processing for centering. When the lens has a strain accumulated during the precision press-molding and the cooling of the lens, the lens may be broken during its processing. Therefore, the lens is annealed beforehand to decrease the strain, the surface thereof is cleaned by washing and then an optical thin film such as an anti-reflection film is formed on the optical-function surface. In the above step, fogging or yellowing does not easily occur on the lens surface under heat during the annealing thereof, so that there can be produced an aspherical lens having an optical thin film excellent in adhesion. Further, it is advantageous for producing an aspherical lens having an optical thin film excellent in adhesion that even the washing does not easily cause the lens surface to have fogging or yellowing.

The above process is suitable for producing aspherical lenses with negative refractive power (a concave meniscus lens, a double-concave lens and a plano-concave lens). With regard to these lenses, there are some cases where lenses produced by press-molding a glass while completely filling the glass in a space (cavity) in a press mold are not ground or polished. In the above molding, if the cavity volume at the time of the press-molding and the volume of the glass material are not rigorously in agreement, the glass enters a space between mold members of the press mold to form molding burrs or the filling of the glass in the cavity is insufficient, so that the lens is degraded in surface accuracy and the like. For overcoming the above problem, there is employed a method in which the cavity volume and the volume of the glass material are brought into rigorous agreement or a method in which the circumference of the portion that constitutes the optical-function surface of the lens is left as a non-transfer surface without defining it with the press mold. In the latter method, no molding burr is formed so long as the glass is not fully filled in the cavity even when the volume of the glass material increases in a range in which the optical-function surface can be formed without impairing the surface accuracy.

In a method of directly shaping glass materials from a molten glass, the volume varies slightly among the glass materials, so that the latter method in which the glass is not fully filled in the cavity is desirable. In lenses produced by the above method, the circumference of the optical-function surface is ground or polished and used as a positioning reference surface for fixing the lens to a lens holder. For example, when the lens of the present invention is used as the lens 11 described in JP-A-2005-331641 and combined with the lens 12 to constitute the first lens group constituting an image-sensing optical system, not only the above reference surface is used for precisely determining a distance between these two lenses, but also it is used as a reference surface for determining the directions of lenses for precisely matching the directions of the lenses for bringing the optical axes of the lenses into agreement (for example, for bringing the optical axes of the lenses G11 and G12 into precise agreement).

The above reference surface for positioning is formed by grinding or polishing the circumferential side surface of the lens into the form of a cylinder and (at the same time) forming a flat plane perpendicular to the optical axis with the optical-function surface being on the concave surface side (when the lens is a double-concave lens, a plane perpendicular to the optical axis is formed on at least one of the two concave surface sides).

According to the above embodiment, even when there is carried out annealing for fully decreasing a strain so that the lens is not broken by the above grinding or polishing, the lens surface is not altered and the adhesion of an optical thin film can be excellently maintained.

In the above manner, the optical-function surface having an aspherical form is formed by the precision press-molding and the non-optical-function surface is formed by grinding or polishing, and an optical thin film is formed on the optical-function surface of the thus-obtained lens by a known method such as a vapor deposition method. The optical thin film is as explained already.

In the thus-obtained lens, the adhesion between the glass and the optical thin film is excellent.

The aspherical lens of the present invention has negative refractive power and is preferably combined with a lens having positive refractive power and having a refractive index ($n_d$) of 1.82 or more and an Abbe's number ($v_d$) of 25 or less for use in a lens group for chromatic aberration correction. In this case, the above lens with positive refractive power includes, for example, a convex meniscus lens, a double convex lens and a plano-convex lens, and it is desirable to form an anti-reflection film on the optical-function surface thereof.

The glass constituting the above lens with positive refractive power is preferably a glass having a refractive index ($n_d$) of over 1.82 and an Abbe's number ($v_d$) of 24.5 or less.

One example of the above glass is an optical glass comprising $P_2O_5$ and $Nb_2O_5$, and specifically, it includes a first glass that is suitable when an optical-function surface is formed by grinding or polishing and a second glass that is suitable when an optical-function surface is formed by precision press-molding.

The first glass is an optical glass comprising, by mass %, 5 to 32% of $P_2O_5$, 27 to 65% of $Nb_2O_5$, 0 to 20% of $TiO_2$, 0 to 12% of $WO_3$, 0 to 15% of $Bi_2O_3$, 0 to 30% of BaO, 0 to 15% of total of $Li_2O$, $Na_2O$ and $K_2O$, 0 to 6% of CaO, 0 to 6% of SrO, 0 to 6% of ZnO, 0 to 16% of $B_2O_3$, 0 to 5% of $SiO_2$, 0 to 5% of $ZrO_2$, 0 to 10% of $Ta_2O_5$ and 0 to 5% of $Al_2O_3$ and containing 0 to 1%, based on the total glass content, of $Sb_2O_3$.

The second glass is an optical glass comprising $P_2O_5$, $Nb_2O_5$ and $Li_2O$, more specifically an optical glass comprising, by mol %, 15 to 45% of $P_2O_5$, 3 to 35% of $Nb_2O_5$, 2 to 35% of $Li_2O$, 0 to 20% of $TiO_2$, 0 to 40% of $WO_3$, 0 to 20% of $Bi_2O_3$, 0 to 30% of $B_2O_3$, 0 to 25% of BaO, 0 to 25% of ZnO, 0 to 20% of MgO, 0 to 20% of CaO, 0 to 20% of BrO, 0 to 30% of $Na_2O$, 0 to 30% of $K_2O$, the total content of $Li_2O$, $Na_2O$ and $K_2O$ being 45% or less, 0 to 15% of $Al_2O_3$, 0 to 15% of $SiO_2$, 0 to 10% of $La_2O_3$, 0 to 10% of $Gd_2O_3$, 0 to 10% of $Yb_2O_3$, 0 to 10% of $ZrO_2$ and 0 to 10% of $Ta_2O_5$.

Other example of the above glass, i.e., a third glass is an optical glass comprising $SiO_2$, BaO, $TiO_2$ and $Nb_2O_5$, and more specifically, it is an optical glass comprising, by mass %, 18 to 30% of $SiO_2$, 12 to 23% of BaO 22 to 37% of $TiO_2$, 7 to 16% of $Nb_2O_5$, 5 to 20% of $Na_2O$, 0 to 6% of $K_2O$, 0 to 5% of CaO, 0 to 5% of SrO, 0 to 4% of $ZrO_2$, 0 to 3% of $Ta_2O_5$, 0 to 1% of $Sb_2O_3$ and 0 to 0.5% of $P_2O_5$. The third glass is suitable as a glass when the optical-function surface of a lens is formed by grinding or polishing.

The lens with positive refractive power is produced from any one of these high-refractivity low-dispersion glass. The lens with positive refractive power may be a spherical lens or aspherical lens based on an optical design. When it is a spherical lens, any one of the above first to third glasses is used and the optical-function surface is formed by grinding or polishing. When it is an aspherical lens, the above second glass is used and the optical-function surface is formed by precision press-molding.

When a glass having more excellent light transmittance is used as a glass for constituting a lens with negative refractive power in the lens unit of the present invention, desirably, the optical-function surface of the above lens is formed by grinding or polishing, that is, the optical-function surface of the lens is a ground or polished surface. In a glass having a small Abbe's number and having a low glass transition temperature suitable for precision press-molding, the transmittance thereof on a short wavelength side in the visible light region tends to decrease as described already as compared with a glass that is to be solely ground or polished. Therefore, when the above lens is constituted of a glass that is to be solely ground or polished, such as the third glass, there can be provided a lens unit that corrects chromatic aberration with a compact lens constitution and that is further excellent in light transmittance.

On the other hand, when the lens with negative refractive power is constituted of a glass or precision press-molding such as the second glass, an aspherical lens can be employed as the above lens, so that there can be provided an image-sensing optical unit having a more compact optical system and having less spherical aberration. In this case, since the lens with negative refractive power in the lens unit is constituted of the glass having the predetermined Abbe's number, excellent chromatic aberration correction can be performed even without excessively decreasing the Abbe's number of a glass constituting a lens with positive refractive power, so that there can be provided a lens unit excellent in light transmittance while using the two aspherical lenses.

Further, when the lens with positive refractive power is constituted of a glass like the first glass that gives high refractivity and high dispersion as compared with the second and third glasses, there can be provided a means to cope with an image-sensing optical unit having a more compact constitution.

In a lens unit in which the lens with positive refractive power is constituted of the first glass or the second glass, the transmittance on the short wavelength side of the visible light region tends to decrease as compared with a lens unit in which the above lens is constituted of the third glass. In an imaging system capable of correcting a color balance by digitizing an image, such as a digital still camera or a digital video camera, the above decrease in transmittance can be corrected. Therefore, the above lens unit in which the lens with positive refractive power is constituted of the first glass or second glass is preferred for use in imaging systems such as a digital camera and the like.

The glass constituting the lens with negative refractive power is the above glass having a high refractive index and an Abbe's number of 40 or more as described above and has excellent light transmittance, so that the freedom of selection of a glass for constituting the lens with positive refractive power is expanded.

An anti-reflection film (preferably having a multi-layer structure) is formed on at least on the optical-function surface of the thus-obtained lens with positive refractive power, the above aspherical lens with negative refractive power is combined therewith and these two lenses are fixed to a lens holder, whereby there can be obtained a lens unit whose chromatic aberration is corrected.

The above lens unit is suitable as a lens unit that is to be arranged closest to an object in an image-sensing optical unit. In this case, the lens unit is preferably a unit with negative refractive power.

For example, the above unit (the lens with negative refractive power to be positioned on the object side), a lens unit with positive refractive power and a lens unit with positive refractive power are consecutively arranged in this order from the object side to the image side and it is ensured that the distance from one unit to another varies, whereby there can be obtained an image-sensing optical unit having a zoom function. And, it is preferred to provide an aperture diaphragm between the first unit and the second unit when they are counted from the object side.

It is preferred to provide an anti-reflection film having a multi-layer structure on the optical-function surface of each lens constituting the above image-sensing optical unit.

The above lens unit and the above image-sensing optical unit are suitable as units for camera lenses such as a near focus lens, a zoom lens, etc., and camera lenses (in particular, a lens for a digital camera).

Preferred embodiments of the present invention have been explained hereinabove with regard to the aspherical lens with negative refractive power, while the present invention can also produce its effects on an aspherical lens with positive refractive power.

EXAMPLES

The present invention will be explained with reference to Examples hereinafter, while the present invention shall not be limited by these Examples.

Various properties of optical glasses were measured according to the following methods.

(1) Refractive Index ($n_d$) and Abbe's Number ($v_d$)

An optical glass was maintained at a temperature between a glass transition temperature ($T_g$) and a sag temperature ($T_s$) and the resultant optical glass was measured for a refractive index ($n_d$) and an Abbe's number ($v_d$) at a temperature decrease rate of −30° C./hour (using "GMR-1" supplied by Kalnew Optics Corporation) according to the refractive index measuring method of Japan Optical Glass Industrial Society Standard.

(2) Glass Transition Temperature ($T_g$) and Sag Temperature ($T_s$)

Measurements were made at a temperature elevation rate of 4° C./minutes under a load of 98 mN with an apparatus for thermomechanical analysis "TMA8510" supplied by Rigaku Corporation.

For obtaining glass compositions shown in Table 1-1 and Table 1-2, oxides, carbonates, sulfates, nitrates, hydroxides, etc., such as $H_3BO_3$, $La_2O_3$, ZnO, $ZnCO_3$, $Gd_2O_3$, $ZrO_2$, etc., as raw materials for introducing glass components were weighed to prepare glass raw materials having a total amount of 250 to 300 g each, and each glass raw material was fully mixed to obtain a prepared batch. Each of the prepared batches was placed in a platinum crucible and melted with stirring in air in an electric furnace maintained at 1,200 to 1,450° C. for 2 to 4 hours. After the melting, each molten glass was cast into a 40×70×15 mm mold made of carbon and was allowed to cool to a glass transition temperature, and immediately thereafter the glass was placed in an annealing furnace, annealed in a glass transition temperature range for approximately 1 hour and allowed to cool to room temperature in the furnace to give an optical glass. In the thus-obtained optical glasses, there was deposited no crystal observable through an optical microscope of 100 magnifications.

Tables 1-1 and Table 1-2 show properties of the thus-obtained optical glasses.

[Table 1-1]

TABLE 1-1

| Glass composition (mol %) | 1 | 2 | 3 | 4 | 5 |
|---|---|---|---|---|---|
| $B_2O_3$ | 32.48 | 36.96 | 35.34 | 36.09 | 33.43 |
| $SiO_2$ | 4.54 | 3.14 | 5.44 | 4.29 | 7.79 |
| ZnO | 36.48 | 30.82 | 30.46 | 30.98 | 27.28 |
| $Li_2O$ | 0.00 | 0.00 | 0.00 | 0.00 | 0.00 |
| $La_2O_3$ | 11.36 | 12.11 | 11.97 | 12.02 | 14.81 |
| $Gd_2O_3$ | 4.54 | 5.03 | 4.97 | 4.99 | 3.98 |
| $La_2O_3 + Gd_2O_3$ | 15.9 | 17.14 | 16.94 | 17.01 | 18.79 |
| $ZrO_2$ | 3.03 | 3.14 | 3.89 | 3.82 | 4.68 |
| $Ta_2O_5$ | 3.03 | 3.14 | 3.11 | 2.97 | 4.6 |
| $WO_3$ | 4.54 | 5.66 | 4.82 | 4.84 | 3.43 |
| $Nb_2O_5$ | 0.00 | 0.00 | 0.00 | 0.00 | 0.00 |
| $GeO_2$ | 0.00 | 0.00 | 0.00 | 0.00 | 0.00 |

TABLE 1-1-continued

| Glass composition (mol %) | 1 | 2 | 3 | 4 | 5 |
|---|---|---|---|---|---|
| BaO | 0.00 | 0.00 | 0.00 | 0.00 | 0.00 |
| Total | 100.00 | 100.00 | 100.00 | 100.00 | 100.00 |
| Total content of alkali metal oxides | 0.00 | 0.00 | 0.00 | 0.00 | 0.00 |
| $n_d$ | 1.8392 | 1.8392 | 1.8372 | 1.8356 | 1.8515 |
| $v_d$ | 40.0 | 40.0 | 40.5 | 40.5 | 40.2 |
| Glass transition temperature (° C.) | 581 | 590 | 594 | 592 | 608 |
| Sag temperature (° C.) | 623 | 635 | 637 | 635 | 655 |

[Table 1-2]

TABLE 1-2

| Glass composition (mol %) | 6 | 7 | 8 | 9 |
|---|---|---|---|---|
| $B_2O_3$ | 34.18 | 36.13 | 36.54 | 42.26 |
| $SiO_2$ | 6.36 | 4.03 | 6.43 | 1.67 |
| ZnO | 28.14 | 28.55 | 24.1 | 21.76 |
| $Li_2O$ | 0.00 | 0.00 | 0.00 | 0.00 |
| $La_2O_3$ | 14.63 | 14.35 | 16.06 | 16.74 |
| $Gd_2O_3$ | 4.05 | 4.11 | 3.21 | 3.35 |
| $La_2O_3 + Gd_2O_3$ | 18.68 | 18.46 | 19.27 | 20.09 |
| $ZrO_2$ | 4.45 | 4.52 | 4.82 | 5.02 |
| $Ta_2O_5$ | 4.69 | 4.76 | 4.82 | 5.02 |
| $WO_3$ | 3.5 | 3.55 | 4.02 | 4.18 |
| $Nb_2O_5$ | 0.00 | 0.00 | 0.00 | 0.00 |
| $GeO_2$ | 0.00 | 0.00 | 0.00 | 0.00 |
| BaO | 0.00 | 0.00 | 0.00 | 0.00 |
| Total | 100.00 | 100.00 | 100.00 | 100.00 |
| Total content of alkali metal oxides | 0.00 | 0.00 | 0.00 | 0.00 |
| $n_d$ | 1.8517 | 1.8517 | 1.8511 | 1.8516 |
| $v_d$ | 40.2 | 40.1 | 40.2 | 40.4 |
| Glass transition temperature (° C.) | 604 | 602 | 609 | 614 |
| Sag temperature (° C.) | 650 | 647 | 655 | 657 |
| Liquidus temperature (° C.) | 1040 | 1040 | 1050 | 1050 |
| Viscosity (dPa · s) at liquidus temperature | 5.1 | 4.5 | 4.8 | 3.9 |
| Specific gravity | 5.25 | 5.24 | 5.21 | 5.2 |

Glass materials for precision press-molding were produced from the above glasses in the following manner.

First, a molten glass held at 1,050 to 1,450° C. (corresponding to a glass viscosity of 4 to 0.05 dPa·s) in an electric furnace was caused to continuously flow downward from a platinum alloy pipe that was temperature-adjusted to 1,050° C. (corresponding to a glass viscosity of 4 dPa·s) at a constant flow rate, the forward end of the molten glass flow was received with a glass material shaping mold and at a time when a molten glass gob having a predetermined weight was separable from the above forward end, the shaping mold was moved downward at a sufficiently greater speed than the downward flowing speed of the molten glass flow, whereby the molten glass gob was separated. When the molten glass was caused to flow downward, it had a viscosity of 7 dPa·s.

The glass-supporting surface of the glass material shaping mold was constituted of a porous material, and a high-pressure gas was introduced to the reverse side of the porous material and ejected through the porous material.

The separated molten glass gob was shaped into a glass material having one axis of rotational symmetry while the glass gob was caused to float over the above glass-supporting surface of the mold by applying air pressure thereto, and the glass material was annealed. Molten glass gobs obtained in the above manner respectively had masses equivalent to masses of corresponding glass materials obtained in the above manner and the thus-obtained glass materials had a mass accuracy of ±1% or smaller.

In the shaping of the above glass material, a molten glass is caused to continuously flow out of a temperature-controlled platinum pipe at a constant rate, a glass material shaping mold that is carried to a position beneath the pipe is moved upward to receive the lower end of the molten glass flow. In this state, a narrow portion is formed between the lower end of the molten glass flow and the pipe side thereof, and the glass material shaping mold is caused to rapidly move downward at a predetermined time. By this operation, the molten glass flow is separated in the narrow portion and a molten glass gob including the lower end and having a predetermined weight can be obtained on the glass-supporting surface.

A plurality of glass material shaping molds are carried to the position beneath the pipe one after another, the above step is carried out to receive molten glass gobs having a predetermined weight each one after another and the molten glass gobs are carried away one after another. The shaping molds are arranged on a turn table and the table is index-turned to carry out the above operation. Each molten glass gob is shaped into a glass material while causing it to float above the glass-supporting surface of the mold. Glass materials were produced by repeating the step of taking a glass material out of a shaping mold, receiving a molten glass gob with the shaping mold and shaping it into a glass material. The glass was caused to continuously float until each glass material was taken out of the shaping molds.

The entire surface of each of the thus-produced glass materials was formed by solidification of the molten glass and was a free surface. None of defects such as striae, devitrification, breaking and bubbles was found on their surfaces and inside each of them.

The glass materials produced by the above method were precision press-molded with a precision press-molding apparatus shown in FIG. 1 as follows. A glass material 4 was placed between an upper mold member 1 and a lower mold member 2 which were made of SiC each and which had a carbon-containing film (diamond-like carbon film) formed on each molding surface, then, the atmosphere in a quartz tube 11 was replaced with a nitrogen atmosphere and a heater (not shown) wound around the outer surface of the quartz tube was electrically powered to heat the inside of the quartz tube 11. The temperature inside the mold was adjusted to a temperature at which the viscosity of the glass material 4 became $10^5$ to $10^9$ dPa·s, and then while this temperature was maintained, a pressing rod 13 was caused to move downward to press the upper mold member 1 from above, so that the glass material 4 in the mold was pressed. The pressing was carried out at a pressure of 5 to 15 MPa for a press time period of 10 to 300 seconds. After the pressing, the pressing pressure was removed, and a glass molded product obtained by aspherical press-molding was gradually cooled to a glass transition temperature in a state where it was in contact with the upper mold member 1 and the lower mold member 2. Then, the glass molded product was rapidly cooled to about room temperature and the glass that was molded into an aspherical lens was taken out of the mold.

In the above precision press-molding, the glass did not come in contact with a sleeve that guided the upper mold member, (the forms of) the molding surfaces of the upper and lower mold members were transferred, the glass was molded and the circumference of the optical-function surface constituted a non-transfer surface.

The above precision press-molding was carried out by two methods; In one precision press-molding method, a glass material was introduced into a space between the upper mold member and the lower mold member of a press mold, the press mold and the glass material were heated together and the glass material was pressed to produce an aspherical lens, and in the other precision press-molding method, a glass material heated separately from a pre-heated press mold was introduced into the press mold and pressed to produce an aspherical lens.

FIG. 1 schematically shows how the precision press-molding is carried out by a method in which a press mold and a glass material are heated together, and numeral 3 indicates a sleeve, 9 indicates a support rod, 10 indicates a support bed and 14 indicates a thermocouple. Aspherical lenses having a convex meniscus form, obtained in the above manner, were annealed in the atmosphere at 560° C. for 3 hours. No fogging was visually observed on the surfaces of the obtained lenses, and they were enlarged and observed through an optical microscope to show smooth surfaces.

In the above Example, the concave meniscus lenses both surfaces of which had aspherical forms were produced. Depending upon selections of the form and dimensions of a press mold as required, there can be produced aspherical lenses with negative refractive power such as a double concave lens and a plano-concave lens and aspherical lenses with positive refractive power such as a convex meniscus lens, a double convex lens and a plano-convex lens.

The above aspherical lenses were annealed at their glass transition temperatures or lower to remove carbon films remaining on the surfaces by oxidation, decrease stains in the lenses and finely adjust their refractive indices.

The outer circumferences of the optical-function surfaces, that is, their non-transfer surface portions were ground or polished to perform centering and edging and form reference surfaces for positioning when the lenses were to fixed in holders.

After the above grinding or polishing, the lenses were washed, dried and then placed in the chamber of a vapor deposition apparatus, and by vapor deposition, there were formed optical multi-layer films for preventing reflection on a lens surface in the visible light region.

The aspherical lenses coated with the anti-reflection films, obtained in the above manner, were excellent in adhesion between glass and film, and they were suitable as a concave meniscus lens in the foremost position of a zoom lens.

Meanwhile, a carbon-containing film was coated on the surface of each of glass materials formed of $Li_2O$-containing glasses, and each glass material was precision press-molded with a press mold that was made of SiC and that had a carbon release film formed on the molding surface thereof, to give aspherical concave meniscus lenses. These lenses were annealed in the same manner as that described above, processed for centering and edging and washed, and then an anti-reflection film was formed on the optical-function surface of each of the lenses. However, it was observed that the films partly peeled since the adhesion of the anti-reflection films was insufficient.

Optical glasses shown in Tables 2-1, 2-2, 2-3 and 2-4 were used to produce convex meniscus lenses. As a method for producing them, there was employed a method in which a glass material was heated and press-molded to obtain a glass molded product having a form close to an intended lens form, the he glass molded product was annealed to decrease a strain and finely adjust its optical properties and it was grounded or polished to complete a spherical lens (to be referred to as "polishing method") or a method in which a glass material was heated and precision press-molded to produce an aspherical lens (to be referred to as "precision press-molding method"). Tables 2-1, 2-2, 2-3 and 2-4 show what glasses were used and which method was employed.

Measurements for a refractive index ($n_d$), an Abbe's number ($v_d$) and a glass transition temperature ($T_g$) were made according to the above-described measurement methods.

$\lambda_{70}$ represents a wavelength at which the spectral transmittance obtained by using a glass sample that was polished to have a thickness of 10.0±0.1 mm and that had flat surfaces in parallel with each other and causing light to enter the polished surface from the perpendicular direction became 70% in the wavelength region of 280 to 700 nm, and $\lambda_{50}$ represents a wavelength at which the spectral transmittance obtained by using a glass sample that was polished to have a thickness of 10.0±0.1 mm and that had flat surfaces in parallel with each other and causing light to enter the polished surface from the perpendicular direction became 50% in the wavelength region of 280 to 700 nm. The above spectral transmittance refers to an amount represented by $I_{out}/I_{in}$ where in $I_{in}$ is an intensity of incident light to a glass sample and $I_{out}$ is an intensity of transmitted light from the glass sample. It is an amount that includes absorption and scattering of light inside the glass sample and that also includes an influence of reflection on the sample surface.

[Table 2-1]

TABLE 2-1

| Glass composition (mass %) | 11 | 12 | 13 | 14 |
|---|---|---|---|---|
| $P_2O_5$ | 19.5 | 20.0 | 25.5 | 22.0 |
| $SiO_2$ | 0.0 | 0.0 | 0.5 | 0.0 |
| $B_2O_3$ | 2.5 | 3.0 | 2.0 | 5.5 |
| $TiO_2$ | 16.0 | 12.0 | 15.0 | 13.5 |
| $Nb_2O_5$ | 37.5 | 44.5 | 47.0 | 48.5 |
| $Na_2O$ | 2.0 | 2.5 | 4.5 | 4.0 |
| $K_2O$ | 2.0 | 2.0 | 4.0 | 2.0 |
| CaO | 0.0 | 0.0 | 0.0 | 0.0 |
| SrO | 0.0 | 0.0 | 0.0 | 0.0 |
| BaO | 20.5 | 14.0 | 1.5 | 4.5 |
| ZnO | 0.0 | 2.0 | 0.0 | 0.0 |
| $ZrO_2$ | 0.0 | 0.0 | 0.0 | 0.0 |
| $Sb_2O_3$ (based on glass composition) | 0.75 | 0.20 | 0.30 | 0.50 |
| Total | 100.0 | 100.0 | 100.0 | 100.0 |
| $n_d$ | 1.9516 | 1.9542 | 1.9459 | 1.9456 |
| $v_d$ | 19.5 | 19.2 | 17.9 | 18.2 |
| $\lambda_{70}$(nm) | 468 | 450 | 463 | 459 |
| Glass type | First glass | | | |
| Lens form | Spherical convex meniscus lens | | | |
| Lens production method | Polishing method | | | |

[Table 2-2]

TABLE 2-2

| Glass composition (mass %) | 15 | 16 | 17 | 18 |
|---|---|---|---|---|
| $P_2O_5$ | 12.0 | 14.5 | 19.5 | 23.5 |
| $Nb_2O_5$ | 50.0 | 48.0 | 45.0 | 34.5 |
| BaO | 21.0 | 24.0 | 16.5 | 16.0 |
| $B_2O_3$ | 7.0 | 2.5 | 2.5 | 3.0 |
| $TiO_2$ | 6.0 | 6.0 | 8.5 | 18.0 |
| $Li_2O$ | 0.0 | 0.0 | 0.0 | 0.0 |
| $Na_2O$ | 0.0 | 0.0 | 3.0 | 0.0 |
| $K_2O$ | 4.0 | 5.0 | 4.0 | 5.0 |
| CaO | 0.0 | 0.0 | 0.0 | 0.0 |
| SrO | 0.0 | 0.0 | 1.0 | 0.0 |
| ZnO | 0.0 | 0.0 | 0.0 | 0.0 |
| $SiO_2$ | 0.0 | 0.0 | 0.0 | 0.0 |
| $ZrO_2$ | 0.0 | 0.0 | 0.0 | 0.0 |
| $Sb_2O_3$ (based on glass composition) | 0.30 | 0.30 | 0.05 | 0.05 |
| Total | 100.0 | 100.0 | 100.0 | 100.0 |
| $n_d$ | 1.9028 | 1.9491 | 1.9193 | 1.9309 |
| $v_d$ | 21.1 | 21.0 | 20.5 | 19.2 |
| $\lambda_{50}$(nm) | 414 | 415 | 413 | 413 |
| Glass type | First glass | | | |
| Lens form | Spherical convex meniscus lens | | | |
| Lens production method | Polishing method | | | |

[Table 2-3]

TABLE 2-3

| Glass composition (mass %) | 19 | 20 | 21 | 22 |
|---|---|---|---|---|
| $P_2O_5$ | 23.8 | 24.0 | 24.0 | 24.0 |
| $B_2O_3$ | 3.0 | 4.0 | 4.0 | 4.0 |
| $SiO_2$ | 0.0 | 0.0 | 0.0 | 0.0 |
| $Li_2O$ | 12.0 | 18.0 | 18.0 | 18.0 |
| $Na_2O$ | 9.3 | 14.0 | 15.0 | 11.0 |
| $K_2O$ | 2.0 | 2.0 | 2.0 | 2.0 |
| BaO | 10.0 | 0.0 | 0.0 | 2.0 |
| ZnO | 5.0 | 0.0 | 2.0 | 0.0 |
| SrO | 0.0 | 0.0 | 0.0 | 0.0 |
| $Bi_2O_3$ | 0.0 | 0.0 | 6.0 | 8.0 |
| $TiO_2$ | 5.0 | 8.0 | 5.0 | 6.0 |
| $Nb_2O_5$ | 17.9 | 20.0 | 18.0 | 19.0 |
| $WO_3$ | 12.0 | 10.0 | 6.0 | 6.0 |
| Total | 100.0 | 100.0 | 100.0 | 100.0 |
| $n_d$ | 1.84509 | 1.84937 | 1.86026 | 1.90015 |
| $v_d$ | 23.54 | 21.96 | 22.61 | 21.51 |
| Glass transition temperature (° C.) | 503 | 493 | 442 | 461 |
| Glass type | Second glass | | | |
| Lens form | Aspherical convex meniscus lens | | | |
| Lens production method | Precision press-molding method | | | |

[Table 2-4]

TABLE 2-4

| Glass composition (mass %) | 23 | 24 | 25 |
|---|---|---|---|
| $SiO_2$ | 24.9 | 28.9 | 24.9 |
| BaO | 16.1 | 13.1 | 15.9 |
| $TiO_2$ | 29.6 | 30.6 | 28.2 |
| $Nb_2O_5$ | 13.1 | 13.1 | 15.7 |
| $Na_2O$ | 8.5 | 10.5 | 12.5 |
| $K_2O$ | 4.0 | 0.0 | 0.0 |
| CaO | 0.8 | 1.3 | 0.8 |
| SrO | 0.0 | 0.0 | 0.0 |
| $ZrO_2$ | 2.0 | 2.0 | 2.0 |
| $Ta_2O_5$ | 1.0 | 0.5 | 0.0 |
| $Sb_2O_3$ | 0.0 | 0.0 | 0.0 |
| Total | | 100.0 | 100.0 |

TABLE 2-4-continued

| Glass composition (mass %) | 23 | 24 | 25 |
|---|---|---|---|
| $n_d$ | 1.8417 | 1.84512 | 1.84565 |
| $v_d$ | 23.97 | 23.96 | 23.9 |
| Glass transition temperature (° C.) | 611 | 625 | 615 |
| $\lambda_{70}$(nm) | 433 | 429 | 418 |
| Glass type | | Third glass | |
| Lens form | | Spherical convex meniscus lens | |
| Lens production method | | Polishing method | |

Then, an anti-reflection film having a multi-layer structure was formed on the optical-function surface of each of the above convex meniscus lenses, and the convex meniscus lenses were combined with the above convex meniscus lenses to obtain lens units as follows. A convex meniscus lens and a concave meniscus lens were fixed to a lens holder at a distance that was calculated on the basis of an optical design so as to obtain a chromatic aberration effect. The directions of the lenses were determined such that the concave surface of the concave meniscus lens and the convex surface of the convex lens faced each other. The convex surface of the concave meniscus lens was on the side of an object, and the concave surface of the convex meniscus lens was on the side of an image.

Then, the above lens unit is used as a first unit that is arranged closest to the object side, a second lens unit that is composed of a convex meniscus lens, a convex meniscus lens and a double convex lens and has positive refractive power as a total is arranged on the image side of the first lens unit, and a double convex lens is arranged on the image side of the second lens unit, to assemble an image-sensing optical unit having a zoom function. The distance between the lenses in each unit is fixed and the distance between the first lens unit and the second lens unit and the distance between the second lens unit and the double convex lens are made variable, to realize the zoom function. In the second unit, the distance between the lenses thereof is set and fixed so as to correct chromatic aberration in the unit.

In the second unit, the concave surface of the convex meniscus lens and the convex surface of the concave meniscus lens are attached to each other, and the double convex lens is fixed apart at a predetermined distance as described above.

In the above manner, there can be fabricated a compact, high-performance and highly reliable image-sensing optical unit having a zoom function. In an image-sensing optical unit that digitizes an image as electronic data with a solid image-sensing device such as CCD or CMOS arranged on the image plane such as a digital still camera or a digital video camera, a filter having a function to correct the color sensitivity of the image-sensing device and a low-pass filer function is arranged between the lens closest to the image side and the image-sensing device.

The above embodiment has been explained with reference to the image-sensing unit having a zoom function, while it can be applied to an image-sensing optical unit to be mounted on a camera of which the focal length is constant such as a cellphone with a camera.

INDUSTRIAL UTILITY

The aspherical lens of the present invention can be suitably used as an aspherical lens made of a glass constituting an image-sensing optical system, particularly suitably as that lens with negative refractive power in a zoom lens which is closest to an object.

Further, the production process of the present invention can be used for producing the above aspherical lens.

The invention claimed is:

1. An aspherical lens formed by precision press-molding an optical glass, the aspherical lens being formed of an optical glass having a refractive index ($n_d$) of over 1.83 and an Abbe's number ($v_d$) of 40 or more and comprising, by mol %, 20 to 45% of $B_2O_3$, 5 to 24% of $La_2O_3$ and 22 to 42% of ZnO but containing no $Li_2O$, the aspherical lens having an optical thin film formed on a surface thereof.

2. The aspherical lens of claim 1, wherein said optical glass contains, as optional components, 0 to 20% of $Gd_2O_3$, 0 to 20% of $SiO_2$, 0 to 10% of $ZrO_2$, 0 to 10% of $Ta_2O_5$, 0 to 10% of $WO_3$, 0 to 10% of $Nb_2O_5$, 0 to 10% of $TiO_2$, 0 to 10% of $Bi_2O_3$, 0 to 10% of $GeO_2$, 0 to 10% of $Ga_2O_3$, 0 to 10% of $Al_2O_3$, 0 to 10% of BaO, 0 to 10% of $Y_2O_3$ and 0 to 10% of $Yb_2O_3$.

3. The aspherical lens of claim 1, wherein said optical glass has a glass transition temperature of less than 640° C.

4. The aspherical lens of claim 1, which is a lens to be positioned closest to an object in an image-sensing optical system having a plurality of lenses that are arranged from an object side to an image side.

5. A lens unit having the aspherical lens recited in claim 1 and a lens with positive refractive power which is formed of an optical glass having a refractive index ($n_d$) of 1.82 or more and an Abbe's number ($v_d$) of 25 or less and which has an anti-reflection film,
said aspherical lens having negative refractive power and having an anti-reflection film,
said aspherical lens and said lens with positive refractive power being combined to correct chromatic aberration.

6. An image-sensing optical unit comprising the lens unit recited in claim 5.

7. A process for the production of an aspherical lens through the steps of heating a glass material formed of an optical glass and precision press-molding the glass material,
the process comprising heating a glass material formed of an optical glass that has a refractive index ($n_d$) of over 1.83 and an Abbe's number ($v_d$) of 40 or more, that comprises, by mol %, 20 to 45% of $B_2O_3$, 5 to 24% of $La_2O_3$ and 22 to 42% of ZnO but that contains no $Li_2O$, precision press-molding the glass material and forming an optical thin film on a surface thereof.

8. The process for the production of an aspherical lens as recited in claim 7, wherein an aspherical lens obtained by the precision press-molding is annealed and then ground or polished to form a non-optical function surface, the aspherical lens is washed and then the optical thin film is formed on the optical function surface.

9. An aspherical lens produced by the process recited in claim 7 and a lens with positive refractive power which is formed of an optical glass having a refractive index ($n_d$) of 1.82 or more and an Abbe's number ($v_d$) of 25 or less and which has an anti-reflection film,
said aspherical lens having negative refractive power and having an anti-reflection film,
said aspherical lens and said lens with positive refractive power being combined to correct chromatic aberration.

* * * * *